US012571522B2

(12) United States Patent
Zhou et al.

(10) Patent No.: US 12,571,522 B2
(45) Date of Patent: Mar. 10, 2026

(54) MULTI-FUNCTIONAL FLASHLIGHT

(71) Applicant: Shenzhen Obuy Technology Co., Ltd, Shenzhen (CN)

(72) Inventors: Shuju Zhou, Shenzhen (CN); Xiaowei Liu, Shenzhen (CN); Manchun Cai, Shenzhen (CN)

(73) Assignee: Shenzhen Obuy Technology Co., Ltd, Shenzhen (CN)

( * ) Notice: Subject to any disclaimer, the term of this patent is extended or adjusted under 35 U.S.C. 154(b) by 0 days.

(21) Appl. No.: 19/047,915

(22) Filed: Feb. 7, 2025

(65) Prior Publication Data

US 2025/0297727 A1 Sep. 25, 2025

(30) Foreign Application Priority Data

Mar. 19, 2024 (CN) ......................... 202420528738.4

(51) Int. Cl.

| | |
|---|---|
| ***F21L 4/02*** | (2006.01) |
| ***F21V 5/04*** | (2006.01) |
| ***F21V 17/06*** | (2006.01) |
| ***F21V 23/04*** | (2006.01) |
| *F21W 111/10* | (2006.01) |
| *F21Y 105/12* | (2016.01) |

(52) U.S. Cl.

CPC .............. *F21V 17/06* (2013.01); *F21L 4/022* (2013.01); *F21V 5/046* (2013.01); *F21V 23/0414* (2013.01); *F21W 2111/10* (2013.01); *F21Y 2105/12* (2016.08)

(58) Field of Classification Search

CPC .................................. F21L 4/02; F21V 5/046

See application file for complete search history.

(56) References Cited

U.S. PATENT DOCUMENTS 5,667,293 A * 9/1997 Own ........................ F21L 4/022
362/208

* cited by examiner

*Primary Examiner* — Sean P Gramling
(74) *Attorney, Agent, or Firm* — Ballard Spahr LLP

(57) ABSTRACT

A multi-functional flashlight includes: a flashlight body having a power supply and a switch assembly arranged therein; a head base connected to an end of the flashlight body, a first mounting position being formed at an end of the head base away from the flashlight body, a second mounting position being formed at an end of the head base close to the flashlight body; a main light source assembly mounted at the first mounting position, a main light source being disposed on the main light source assembly, and being configured to emit light in a length direction of the flashlight body; and a lateral light source assembly mounted at the second mounting position, and configured to emit a ring-shaped light at an acute angle with the flashlight body from a side surface of the flashlight body.

9 Claims, 7 Drawing Sheets

MULTI-FUNCTIONAL FLASHLIGHT

CROSS-REFERENCE TO RELATED APPLICATIONS

The present application claims priority to Chinese patent application No. 2024205287384, entitled "Multi-functional Flashlight", filed on Mar. 19, 2024, the disclosure of which is hereby incorporated by reference in its entirety.

TECHNICAL FIELD

The present disclosure relates to the field of mobile lighting equipment, and particularly relates to a multi-functional flashlight.

BACKGROUND

In the demand for mobile lighting in daily life, flashlights have become indispensable lighting tools in people's life. The flashlight is often used in various scenarios, such as daily maintenance work, night walking, night camping, etc. Since the flashlight is designed primarily to be handhold and illuminate a distant place, its light beads are usually placed on top of the flashlight. Although this kind of direct light source has its advantages, it also limits the usage scenarios of the flashlight. For example, the direct light source may not be ideal for reading or writing, and thus, an additional table lamp would be required in this scenario; and the direct light source may not create the desired atmosphere for camping, and thus, an additional atmosphere lights would be required in this scenario. Therefore, the flashlight can only be used in relatively limited scenarios.

Therefore, there is a need for a multi-functional flashlight that can not only meet the requirement of long-distance illumination, but also be used as a table lamp or an atmosphere light.

SUMMARY

The purpose of this disclosure is to provide a multi-functional flashlight that addresses the shortcomings of prior art. Such multi-functional flashlight can not only meet the requirement of long-distance illumination, but also be used as a table lamp or an atmosphere lamp, thereby adapting to different lighting requirements, and improving the use experience.

To achieve the above objectives, the following solutions are adopted in this disclosure.

A multi-functional flashlight includes:

- a flashlight body having a power supply and a switch assembly arranged therein;
- a head base connected to an end of the flashlight body, a first mounting position being formed at an end of the head base away from the flashlight body, a second mounting position being formed at an end of the head base close to the flashlight body;
- a main light source assembly mounted at the first mounting position, a main light source being disposed on the main light source assembly, and being configured to emit light in a length direction of the flashlight body; and
- a lateral light source assembly mounted at the second mounting position, and configured to emit a ring-shaped light at an acute angle with the flashlight body from a side surface of the flashlight body, the lateral light source assembly including a ring-shaped light source and a ring-shaped lens, an end of the ring-shaped lens being mounted to an edge of the second mounting position, and another end of the ring-shaped lens being sleeved on the flashlight body.

Further, the second mounting position includes an outer ring region and an inner ring region located in the outer ring region. The ring-shaped light source is adapted to be mounted on the outer ring region. The ring-shaped lens is adapted to be mounted on a position of the outer ring region near an edge of the outer ring region. The inner ring region is configured to connect the flashlight body.

Further, a central region is formed in the inner ring region. A wire hole communicating from the first mounting position to the second mounting position is formed in the central region of the head base. A wire is adapted to pass through the wire hole, so as to electrically connect the power supply to the main light source assembly.

Further, the main light source assembly includes a light source plate, a main lens mounted on the light source plate, and a fixing ring that fixes the main lens in the first mounting position. The main light source is disposed on the light source plate, and the light source plate is electrically connected to the power supply through the wire passing through the wire hole.

Further, a pin hole communicating from the first mounting position to the second mounting position is formed in the outer ring region of the head base. A pin is disposed on a side of the light source plate facing away from the main light source. The pin is connected to the ring-shaped light source through the pin hole.

Further, the ring-shaped lens includes a first end close to the head base and a second end close to the flashlight body. An outer side of the ring-shaped lens gradually tapers from the first end to the second end.

Further, a ring-shaped stepped part is formed on the side surface of the flashlight body. When the ring-shaped lens is sleeved on the flashlight body, the second end abuts against the stepped part.

Further, a fixing hole communicating from the first mounting position to the second mounting position is formed in the inner ring region in the head base. An end of the flashlight body is mounted in the inner ring region and fixed to the inner ring region through the fixing hole.

Further, the switch assembly includes: a switch plate disposed in the flashlight body; a main switch; and an alternation switch. The main switch and the alternation switch are disposed on the switch plate and connected to the side surface of the flashlight body. When the main switch is in a turned-on state, the alternation switch is configured to switch the main light source and the ring-shaped light source between a light-on state and a light-off state.

Further, the alternation switch includes: a Hall switch disposed on the switch plate and a push button disposed on the side surface of the flashlight body. A magnet cooperating with the Hall switch is disposed in the push button.

This disclosure has the following advantages.

The main light source assembly is disposed on the head base to realize the long-distance illumination function of the flashlight. The lateral light source assembly is disposed at a position close to the side surface of the flashlight body to realize a table lamp function or an atmosphere lamp function, so that one flashlight simultaneously meets a plurality of illumination requirements. The outer ring region and the inner ring region are formed at the second mounting position of the head base for fixing the ring-shaped lens and the flashlight body respectively. The electrical connection between the ring-shaped light source and the light source plate is realized by arranging the light source plate and the pin. The main switch and the alternation switch are provided for switching different lighting states. The multi-functional flashlight according to any of embodiments of the present disclosure can not only meet the requirement of long-distance illumination, but also be used as a table lamp or an atmosphere lamp, thereby adapting to different lighting requirements, and improving the use experience.

Figure 1:
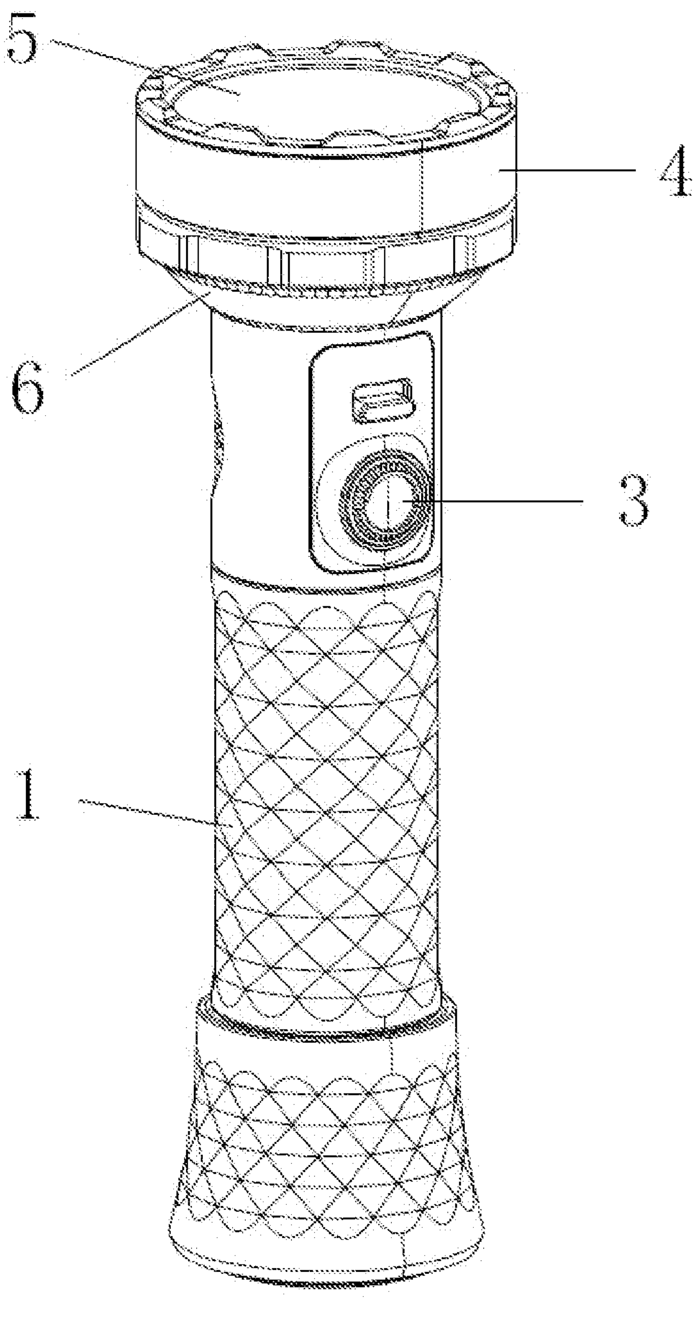
FIG. 1 is a structural schematic view of a multi-functional flashlight of the present disclosure.

Reference numerals in the drawings: 1, flashlight body; 110, stepped part; 2, power supply; 3, switch assembly; 310, switch plate; 320, main switch; 330, alternation switch; 331, Hall switch; 332, push button; 333, magnet; 4, head base; 410, first mounting position; 420, second mounting position; 421, outer ring region; 422, inner ring region; 423, central region; 430, wire hole; 440, pin hole; 450, fixing hole; 5, main light source assembly; 510, main light source; 520, light source plate; 521, pin; 530, main lens; 540, fixing ring; 6, lateral light source assembly; 610, ring-shaped light source; 620, ring-shaped lens; 621, first end; and 622, second end.

DETAILED DESCRIPTION OF THE EMBODIMENTS

The following describes in detail embodiments of the present disclosure, examples of the embodiments are shown in the drawings, in which the same or similar reference numerals denote the same or similar elements or elements having the same or similar functions throughout. The embodiments described below with reference to the drawings are exemplary and are intended to explain the present disclosure and are not to be construed as limiting the present disclosure.

In the description of the present disclosure, it is to be understood that the terms “length”, “width”, “upper”, “lower”, “front”, “rear”, “left”, “right”, “vertical”, “horizontal”, “top”, “bottom”, “inner”, “outer”, etc. indicate the orientations or positional relationships on the basis of the drawings. These terms are only intended for facilitating illustrating the present disclosure and simplifying the illustration, rather than indicating or implying that the devices or elements referred thereto have to present particular orientations, and be constructed and operated in particular orientations, and therefore cannot be construed as limiting the present disclosure.

In addition, the terms “first” and “second” are only intended for illustrative purposes, rather than being construed as indicating or implying relative importance or implicitly designating the number of the technical features as indicated. Thus, the features defined by “first” and “second” may explicitly or implicitly include one or more said feature. In the illustrations of the present disclosure, the term “a plurality of” means two or more than two, unless otherwise explicitly and specifically defined.

In the present disclosure, unless otherwise expressly specified and defined, the terms “mounted”, “connected to”, “coupled” and “fixed” should be understood in a broad sense. For example, the term “coupled” may refer to a fixed connection, a detachable connection, or an integration; it may refer to a mechanical connection or an electrical connection; it may refer to a direct connection or an indirect connection through an intermediate medium; it may refer to an internal connection of two elements or an interaction relationship between two elements. For those of ordinary skill in the art, the specific meanings of the above-described terms in the present disclosure may be understood according to specific circumstances.

Referring to FIGS. 1 to 7, a specific embodiment of a multi-functional flashlight provided by the present disclosure is illustrated.

Figure 2:
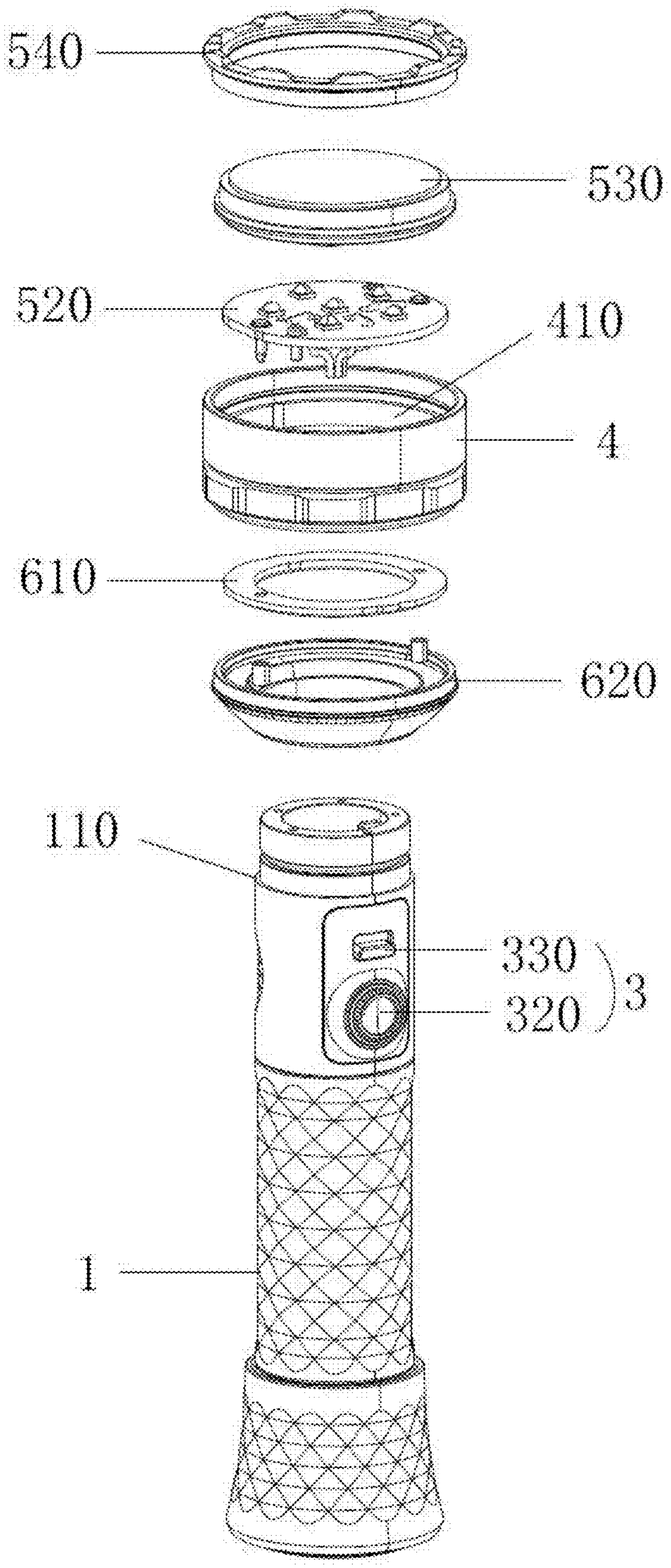
FIG. 2 is an exploded structural schematic view of the multi-functional flashlight of the present disclosure.

Referring to FIG. 1 and FIG. 2, the multi-functional flashlight includes a flashlight body 1, a head base 4, a main light source assembly 5, and a lateral light source assembly 6.

A power supply 2 and a switch assembly 3 are arranged in the flashlight body 1.

The head base 4 is connected to an end of the flashlight body 1. A first mounting position 410 is formed at an end of the head base 4 away from the flashlight body 1. A second mounting position 420 is formed at an end of the head base 4 close to the flashlight body 1.

The main light source assembly 5 is mounted at the first mounting position 410. A main light source 510 is disposed on the main light source assembly 5, and configured to emit light in a length direction of the flashlight body 1.

The lateral light source assembly 6 is mounted at the second mounting position 420, and configured to emit a ring-shaped light at an acute angle with the flashlight body 1 from a side surface of the flashlight body 1. The lateral light source assembly 6 includes a ring-shaped light source 610 and a ring-shaped lens 620. An end of the ring-shaped lens 620 is mounted to an edge of the second mounting position 420, and another end of the ring-shaped lens 620 is sleeved on the flashlight body 1.

Referring to FIG. 2, in the above embodiment, a recessed first mounting position 410 and a recessed second mounting position 420 are respectively formed at two opposite ends of the head base 4. The main light source assembly 5 is mounted in the first mounting position 410. This is a lighting design of a conventional flashlight to meet the requirement of remote illumination. The lateral light source assembly 6 is mounted in the second mounting position 420 for emitting light from the side surface. When the flashlight is placed upright on the table with a head of the flashlight facing upward, the light emitted from the lateral light source assembly 6 is emitted obliquely downward to form a conical light beam, so that the flashlight can be used as a table lamp or an atmosphere lamp and adapts to different lighting requirements. In an embodiment, the diameter of the head base 4 is larger than the diameter of the flashlight body 1, and the lateral light source assembly 6 is mounted at a connection position between the head base 4 and the flashlight body 1 to form a transition portion between the head base 4 and the flashlight body 1.

Figure 4:
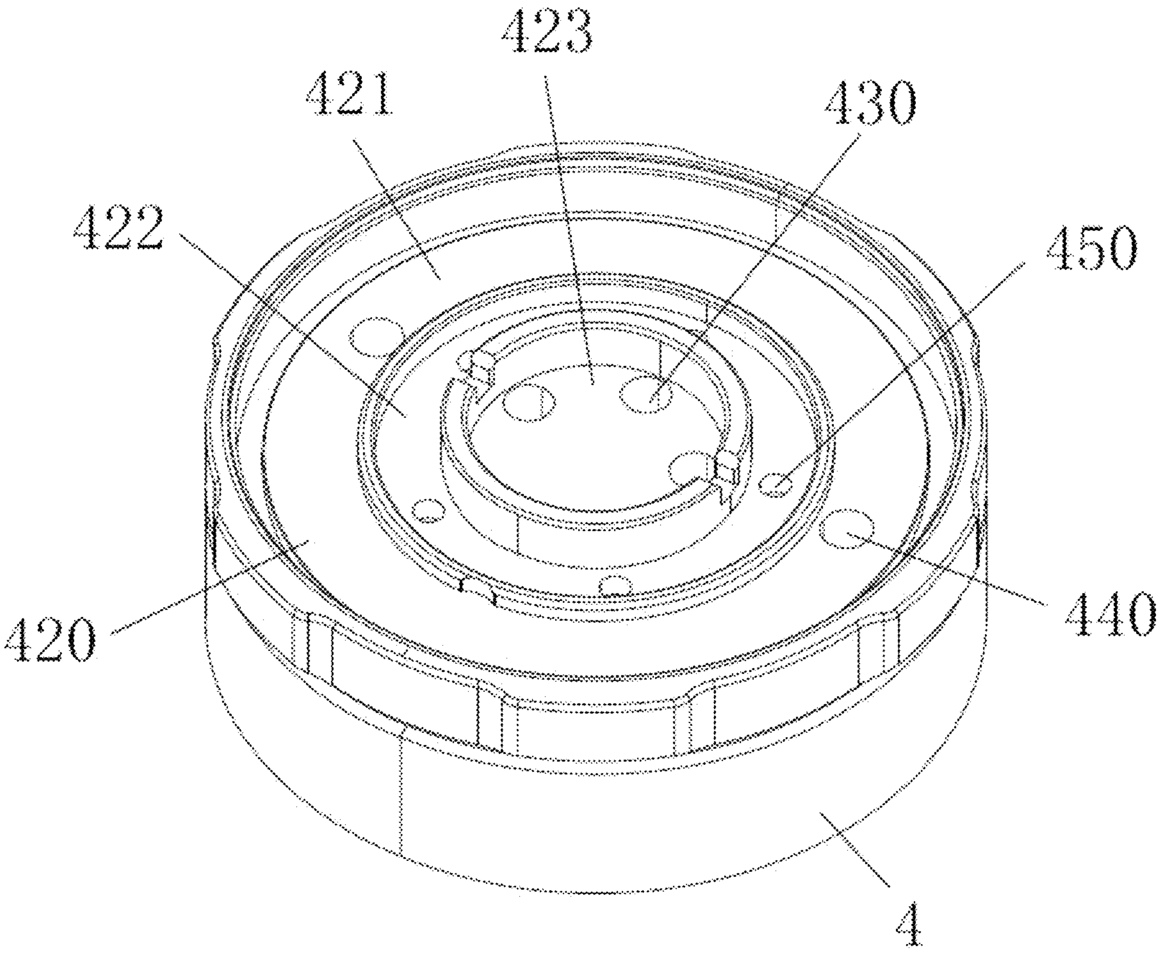
FIG. 4 is a structural schematic view of a head base of the present disclosure.

Referring to FIG. 4, in the above embodiment, the second mounting position 420 includes an outer ring region 421 and an inner ring region 422 located in the outer ring region 421.

The ring-shaped light source 610 is adapted to be mounted on the outer ring region 421, and the ring-shaped lens 620 is adapted to be mounted on a position of the outer ring region 421 near the edge of the outer ring region 421, and the inner ring region 422 is configured to connect the flashlight body 1. In an embodiment, the ring-shaped light source 610 is adapted to be mounted on a ring-shaped region formed by the outer ring region 421, and the ring-shaped lens 620 is adapted to be mounted on a position at the edge of the outer ring region 421, which is an inner side surface of the head base 4 at the second mounting position 420.

Referring to FIG. 4, in the above embodiments, a central region 423 is formed in the inner ring region 422. Wire holes 430 communicating from the first mounting position 410 to the second mounting position 420 are formed in the central region 423 in the head base 4. The wire holes 430 are configured to facilitate electrically connecting the power supply 2 to the main light source assembly 5. In the embodiment, the central region 423, the inner ring region 422, and the outer ring region 421 have the same center, which is also the center of the head base 4. Wires are adapted to pass through the wire holes 430 formed in the central region 423, so that the wires are able to connect the power supply 2 and the switch assembly 3 to the main light source assembly 5 at the first mounting position 410.

Figure 3:
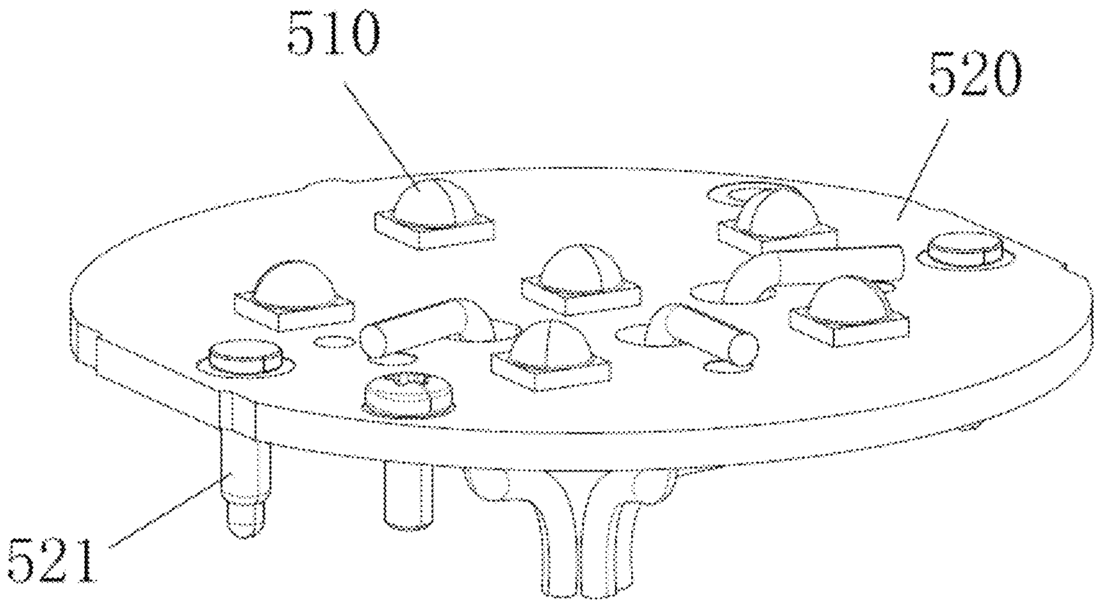
FIG. 3 is a structural schematic view of a light source plate of the present disclosure.

Referring to FIG. 3, in the above embodiments, the main light source assembly 5 includes a light source plate 520, a main lens 530 mounted on the light source plate 520, and a fixing ring 540 that fixes the main lens 530 in the first mounting position 410. The main light source 510 is disposed on the light source plate 520, and the light source plate 520 is electrically connected to the power supply 2 through the wires passing through the wire holes 430. In the embodiment, when the long-distance illumination function of the flashlight is needed, the main light source 510 is turned on and the light emitted by the main light source 510 is emitted through the main lens 530.

Referring to FIG. 3 and FIG. 4, in the above embodiments, a pin hole 440 communicating from the first mounting position 410 to the second mounting position 420 are formed in the outer ring region 421 of the head base 4. A pin 521 is disposed on a side of the light source plate 520 facing away from the main light source 510. The pin 521 is connected to the ring-shaped light source 610 through the pin hole 440. In an embodiment, the light source plate 520 is mounted in the first mounting position 410. The main light source 510 is fixedly disposed on a side of the light source plate 520 facing the main lens 530. The pin 521 on the other side of the light source plate 520 passes through the pin hole 440 to connect to the outer ring region 421 of the second mounting position 420, and abuts against a back surface of the ring-shaped light source 610, so as to supply power to the ring-shaped light source 610 through the light source plate 520. The pin ensures that the connection and disconnection between the light source plate 520 and the ring-shaped light source 610 can be easily realized. In order to ensure that the connection between the pin 521 and the ring-shaped light source 610 is not misaligned, a foolproof recess may be formed on the ring-shaped light source 610 to ensure that a conductive contact on the back surface of the ring-shaped light source 610 aligns with the pin hole 440 when the ring-shaped light source 610 is mounted in the second mounting position 420.

Figure 5:
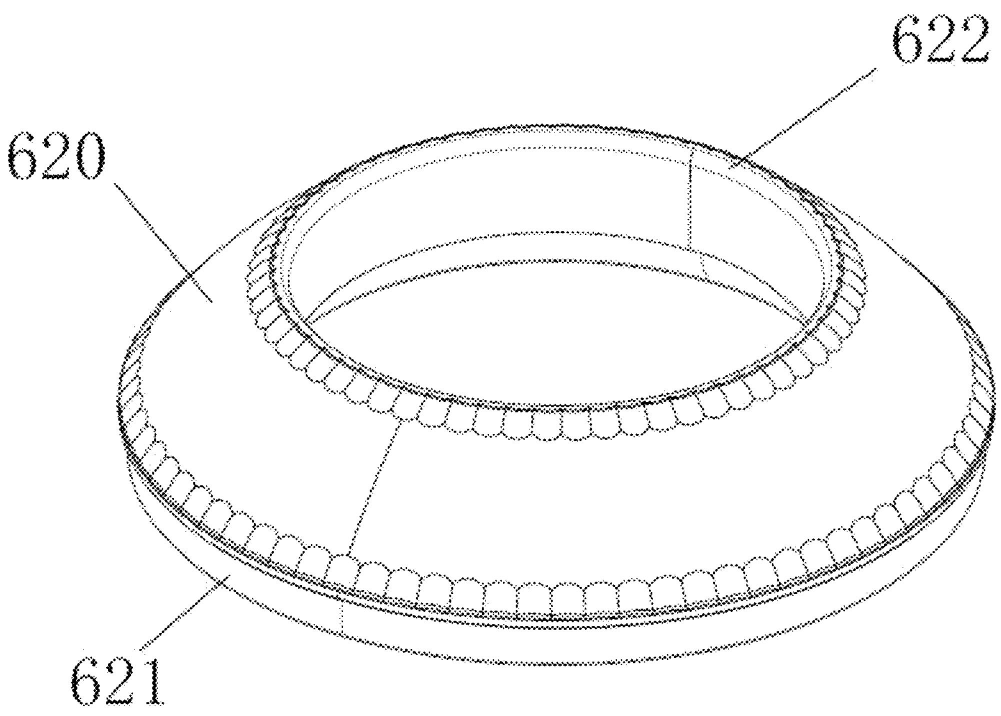
FIG. 5 is a structural schematic view of a ring-shaped lens of the present disclosure.

Referring to FIG. 5, in the above embodiments, the ring-shaped lens 620 includes a first end 621 close to the head base 4 and a second end 622 close to the flashlight body 1. An outer side of the ring-shaped lens 620 gradually tapers from the first end 621 to the second end 622. In an embodiment, in a side view of the ring-shaped lens 620, the side surface of the ring-shaped lens 620 is approximately a trapezoid. When the ring-shaped light source 610 emits light, the light travels to the outside through the side surface of the ring-shaped lens 620, to achieve an obliquely downward emitting effect. The outer diameter of the first end 621 is equal to the diameter of the head base 4, and the outer diameter of the second end 622 is equal to the diameter of the flashlight body 1, so that a smooth transition is formed between the head base 4 and the flashlight body 1. Optionally, the ring-shaped light source 610 may be a multi-color light source.

Referring to FIG. 2, in the above embodiment, a ring-shaped stepped part 110 is formed on the side surface of the flashlight body 1. When the ring-shaped lens 620 is sleeved on the flashlight body 1, the second end 622 abuts against the stepped part 110. In an embodiment, since the first end 621 of the ring-shaped lens 620 is mounted in the second mounting position 420, and the second end 622 abuts against the stepped part 110, when the flashlight body 1 is fixed to the inner ring region 422 of the second mounting position 420, the ring-shaped lens 620 is fixed between the head base 4 and the flashlight body 1.

Referring to FIG. 4, in the above embodiments, a fixing hole 450 communicating from the first mounting position 410 to the second mounting position 420 is formed in the inner ring region 422 of the head base 4. An end of the flashlight body 1 is mounted in the inner ring region 422 and fixed to the inner ring region 422 through the fixing holes 450. In an embodiment, the fixing holes 450 are formed in the inner ring region 422. When the flashlight body 1 is connected to the inner ring region 422 in the second mounting position 420, a screw passes through the fixing hole 450 from one of sides of the first mounting position 410 to connect to an end of the flashlight body 1, so that the flashlight body 1 is fixed to the head base 4.

Figure 6:
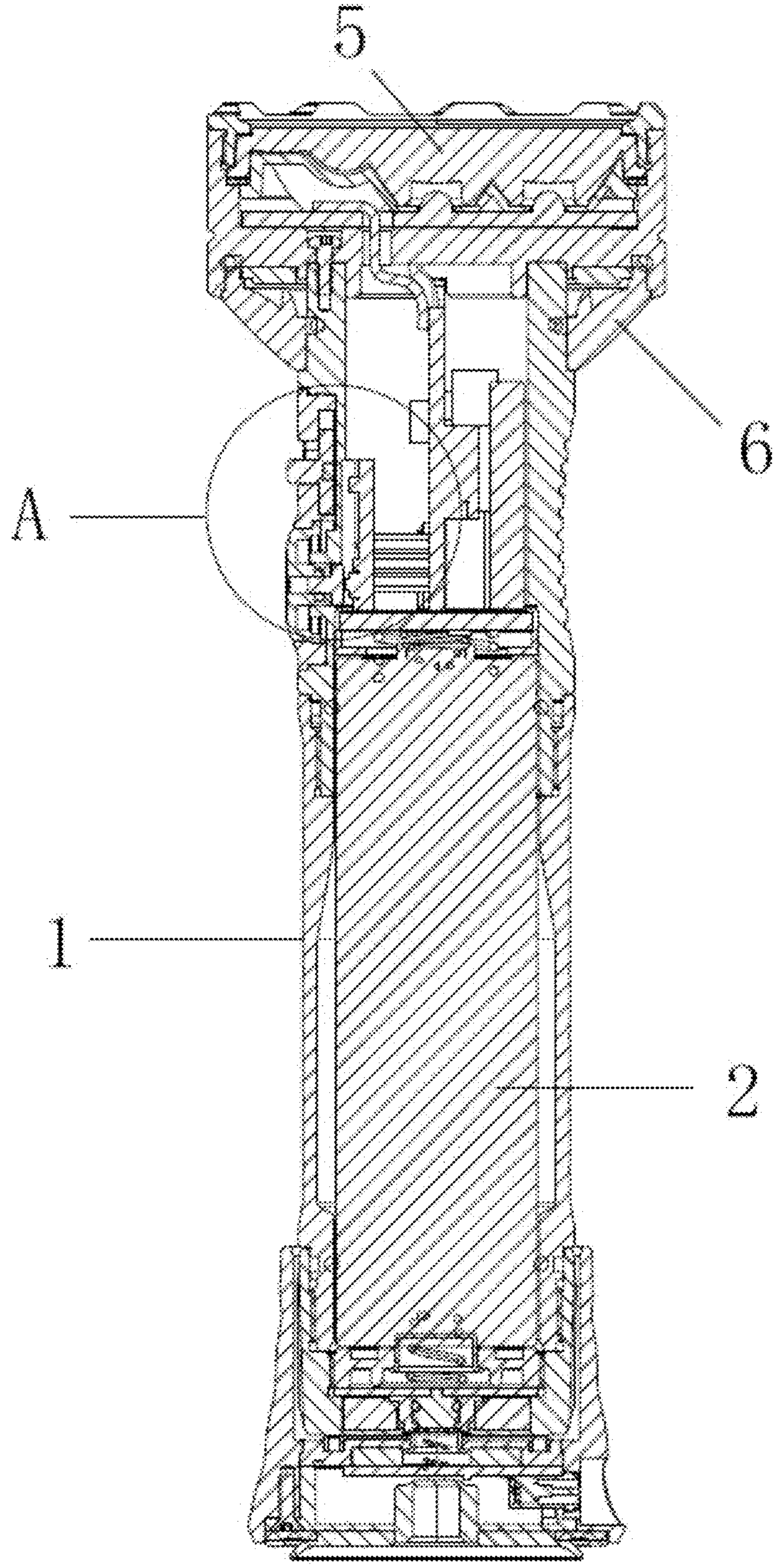
FIG. 6 is a sectional view of the multi-functional flashlight of the present disclosure.
Figure 7:
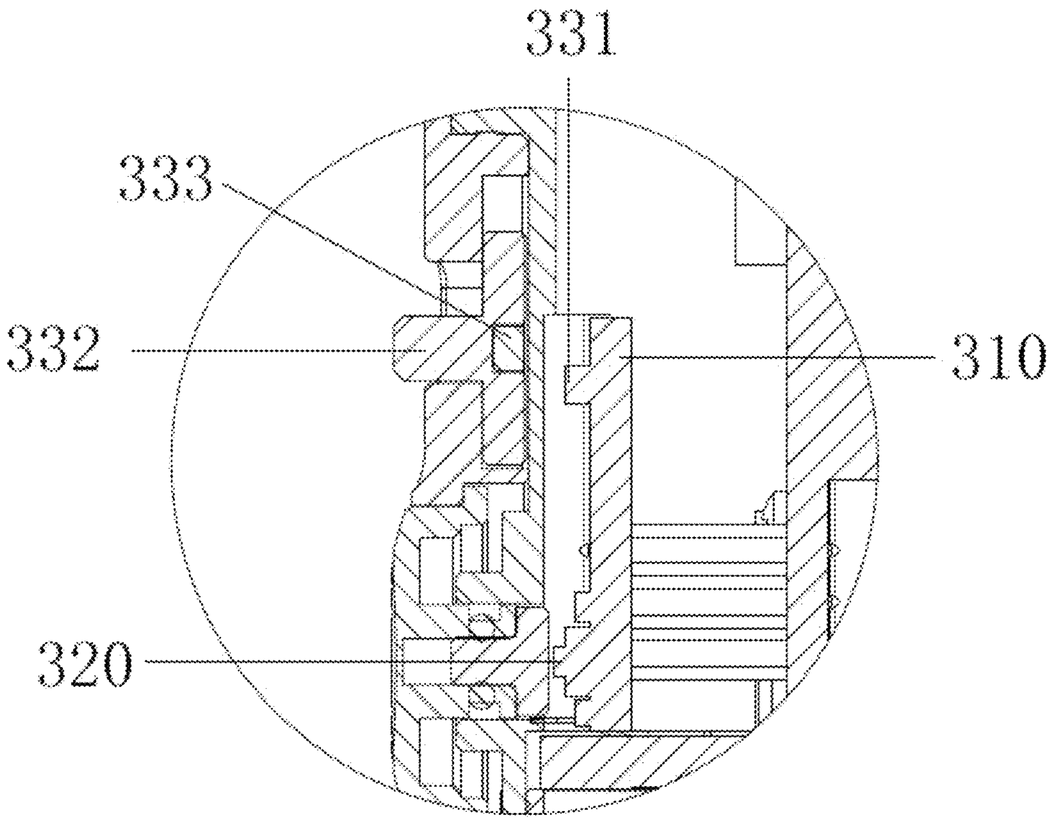
FIG. 7 is an enlarged view of part A of FIG. 6 of the present disclosure.

Referring to FIG. 6 and FIG. 7, in the above embodiments, the switch assembly 3 includes: a switch plate 310 disposed in the flashlight body 1; a main switch 320; and an alternation switch 330. The main switch 320 and the alternation switch 330 are disposed on the switch plate 310 and connected to the side surface of the flashlight body 1. When the main switch 320 is in a turned-on state, the alternation switch 330 is configured to switch the main light source 510 and the ring-shaped light source 610 between a light-on state and a light-off state. In an embodiment, the main switch 320 is a switch for the power supply 2, and is configured to control whether to supply power to light source plate 520, while the alternation switch 330 is configured to switch the targeted light source. Specifically, when the main switch 320 is turned on and the alternation switch 330 is switched to activate the main light source 510, the main light source 510 is on and the ring-shaped light source 610 is off, and the flashlight is in a state for long-distance illumination. When the main switch 320 is turned on and the alternation switch 330 is switched to activate the ring-shaped light source 610, the ring-shaped light source 610 is on and the main light source 510 is off, and the flashlight is in a state for table illumination. When the main switch 320 is turned off, both the main light source 510 and the ring-shaped light source 610 are off.

Referring to FIG. 6 and FIG. 7, in the above embodiment, the alternation switch 330 includes a Hall switch 331 disposed on the switch plate 310 and a push button 332 disposed on the side surface of the flashlight body 1. A magnet 333 cooperating with the Hall switch 331 is disposed in the push button 332. In an embodiment, when the push button 332 is pushed, the magnet 333 moves closer to or far away from the Hall switch 331, so that the alternation switch 330 is in a state turning on the main light source 510 or the ring-shaped light source 610. In this embodiment, a button is disposed on the side surface of the flashlight body 1, and when such button is pressed, the main switch 320 is turned on.

In view of the above, the present embodiment provides a multi-functional flashlight. The main light source assembly 5 is disposed on the head base 4 to realize the long-distance illumination function of the flashlight. The lateral light source assembly 6 is disposed at a position close to the side surface of the flashlight body 1 to realize the table lamp function or an atmosphere lamp function, so that one flashlight simultaneously meets a plurality of illumination requirements. The outer ring region 421 and the inner ring region 422 are formed at the second mounting position 420 of the head base 4 for fixing the ring-shaped lens 620 and the flashlight body 1 respectively. The electrical connection between the ring-shaped light source 610 and the light source plate 520 is realized by arranging the light source plate 520 and the pin 521. The main switch 320 and the alternation switch 330 are provided for switching different lighting states. The multi-functional flashlight according to any of embodiments of the present disclosure can not only meet the requirement of long-distance illumination, but also be used as a table lamp or an atmosphere lamp, thereby adapting to different lighting requirements, and improving the use experience.

The embodiments described above are only some of the preferred implementations of the present disclosure, and the common changes and substitutions made by one skilled in the art within the scope of the disclosed solutions should be considered fall into the protection scope of the present disclosure.

What is claimed is:

1. A multi-functional flashlight, comprising:

a flashlight body, wherein a power supply and a switch assembly are arranged in the flashlight body;

a head base connected to an end of the flashlight body, a first mounting position being formed at an end of the head base away from the flashlight body, a second mounting position being formed at an end of the head base close to the flashlight body;

a main light source assembly mounted at the first mounting position, a main light source being disposed on the main light source assembly, and being configured to emit light in a length direction of the flashlight body; and a lateral light source assembly mounted at the second mounting position, and configured to emit a ring-shaped light at an acute angle with the flashlight body from a side surface of the flashlight body, the lateral light source assembly comprising a ring-shaped light source and a ring-shaped lens, an end of the ring-shaped lens being mounted to an edge of the second mounting position, and another end of the ring-shaped lens being sleeved on the flashlight body, wherein the second mounting position comprises an outer ring region and an inner ring region located in the outer ring region, the ring-shaped light source is adapted to be mounted on the outer ring region, and the ring-shaped lens is adapted to be mounted on a position of the outer ring region near an edge of the outer ring region, and the inner ring region is configured to connect the flashlight body.

2. The multi-functional flashlight of claim 1, wherein a central region is formed in the inner ring region, a wire hole communicating from the first mounting position to the second mounting position is formed in the central region in the head base, and a wire is adapted to pass through the wire hole, so as to electrically connect the power supply to the main light source assembly.

3. The multi-functional flashlight of claim 2, wherein the main light source assembly comprises a light source plate, a main lens mounted on the light source plate, and a fixing ring that fixes the main lens in the first mounting position, the main light source is disposed on the light source plate, and the light source plate is electrically connected to the power supply through the wire passing through the wire hole.

4. The multi-functional flashlight of claim 3, wherein a pin hole communicating from the first mounting position to the second mounting position is formed in the outer ring region in the head base, a pin is disposed on a side of the light source plate facing away from the main light source, and the pin is connected to the ring-shaped light source through the pin hole.

5. The multi-functional flashlight of claim 1, wherein the ring-shaped lens comprises a first end close to the head base and a second end close to the flashlight body, and an outer side of the ring-shaped lens gradually tapers from the first end to the second end.

6. The multi-functional flashlight of claim 5, wherein a ring-shaped stepped part is formed on the side surface of the flashlight body, and when the ring-shaped lens is sleeved on the flashlight body, the second end abuts against the stepped part.

7. The multi-functional flashlight of claim 6, wherein a fixing hole communicating from the first mounting position to the second mounting position is formed in the inner ring region in the head base, and an end of the flashlight body is mounted in the inner ring region and fixed to the inner ring region through the fixing hole.

8. The multi-functional flashlight of claim 1, wherein the switch assembly comprises: a switch plate disposed in the flashlight body; a main switch; and a alternation switch, the main switch and the alternation switch are disposed on the switch plate and connected to the side surface of the flashlight body, when the main switch is in a turned-on state, the alternation switch is configured to switch the main light source and the ring-shaped light source between a light-on state and a light-off state.

9. The multi-functional flashlight of claim 8, wherein the alternation switch comprises a Hall switch disposed on the switch plate and a push button disposed on the side surface of the flashlight body, a magnet cooperating with the Hall switch is disposed in the push button.

* * * * *